United States Patent
Taras et al.

(10) Patent No.: US 10,247,481 B2
(45) Date of Patent: Apr. 2, 2019

(54) MULTIPLE TUBE BANK HEAT EXCHANGE UNIT WITH MANIFOLD ASSEMBLY

(71) Applicant: Carrier Corporation, Farmington, CT (US)

(72) Inventors: Michael F. Taras, Fayetteville, NY (US); Arindom Joardar, Jamesville, NY (US); Tobias H. Sienel, Baldwinsville, NY (US); Mel Woldesemayat, Liverpool, NY (US); Bruce J. Poplawski, Mattydale, NY (US)

(73) Assignee: CARRIER CORPORATION, Farmington, CT (US)

( * ) Notice: Subject to any disclaimer, the term of this patent is extended or adjusted under 35 U.S.C. 154(b) by 459 days.

(21) Appl. No.: 14/763,557

(22) PCT Filed: Nov. 25, 2013

(86) PCT No.: PCT/US2013/071644
§ 371 (c)(1),
(2) Date: Jul. 27, 2015

(87) PCT Pub. No.: WO2014/116351
PCT Pub. Date: Jul. 31, 2014

(65) Prior Publication Data
US 2016/0003545 A1    Jan. 7, 2016

Related U.S. Application Data

(60) Provisional application No. 61/757,273, filed on Jan. 28, 2013.

(51) Int. Cl.
*F28D 1/00*     (2006.01)
*F28D 1/04*     (2006.01)
(Continued)

(52) U.S. Cl.
CPC ............ *F28D 1/0417* (2013.01); *B23P 15/26* (2013.01); *F28D 1/0435* (2013.01);
(Continued)

(58) Field of Classification Search
CPC ............................ F28D 1/0417; F28D 1/0435
(Continued)

(56) References Cited

U.S. PATENT DOCUMENTS

| 4,328,861 A | 5/1982 | Cheong et al. |
| 4,736,597 A | 4/1988 | Anderson et al. |

(Continued)

FOREIGN PATENT DOCUMENTS

| CA | 2240897 A1 | 7/1997 |
| CA | 2537864 A1 | 12/2006 |

(Continued)

OTHER PUBLICATIONS

Chinese Office Action and Search Report for application CN 201380071389.2, dated Dec. 2, 2016, 10 pages.
(Continued)

*Primary Examiner* — Allen Flanigan
(74) *Attorney, Agent, or Firm* — Cantor Colburn LLP (57) ABSTRACT

A multiple bank, flattened tube heat exchange unit includes a first tube bank including a plurality of flattened tube segments extending longitudinally in spaced parallel relationship between a first manifold and a second manifold and a second tube bank including a plurality of flattened tube segments extending longitudinally in spaced parallel relationship between a first manifold and a second manifold, the second tube bank disposed behind the first tube bank. The second manifold of the first tube bank and the second manifold of the second tube bank form a manifold assembly wherein an interior volume of the second manifold of the first tube bank and an interior volume of the second manifold (Continued)

of the second tube bank of the manifold assembly are internally connected in fluid communication.

20 Claims, 9 Drawing Sheets

(51) Int. Cl.
*F28F 9/02* (2006.01)
*F28D 1/053* (2006.01)
*B23P 15/26* (2006.01)

(52) U.S. Cl.
CPC ..... *F28D 1/05358* (2013.01); *F28D 1/05391* (2013.01); *F28F 9/0214* (2013.01)

(58) Field of Classification Search
USPC ........................................................ 165/144
See application file for complete search history.

(56) References Cited

U.S. PATENT DOCUMENTS

| | | | |
|---|---|---|---|
| 4,770,240 A | 9/1988 | Dawson et al. | |
| 4,901,537 A | 2/1990 | Yoshikawa et al. | |
| 5,033,540 A | 7/1991 | Tategami et al. | |
| 5,046,554 A | 9/1991 | Iwasaki et al. | |
| 5,058,662 A | 10/1991 | Nguyen | |
| 5,076,353 A | 12/1991 | Haussmann | |
| 5,186,244 A | 2/1993 | Joshi | |
| 5,348,081 A | 9/1994 | Halstead et al. | |
| 5,509,199 A | 4/1996 | Beamer et al. | |
| 5,538,079 A | 7/1996 | Pawlick | |
| 5,727,618 A | 3/1998 | Mundinger et al. | |
| 5,876,667 A | 3/1999 | Gremel et al. | |
| 5,915,471 A | 6/1999 | Kim | |
| 5,941,303 A | 8/1999 | Gowan et al. | |
| 6,189,603 B1 | 2/2001 | Sugimoto et al. | |
| 6,213,196 B1 | 4/2001 | Ozaki et al. | |
| 6,343,645 B1 | 2/2002 | Baumann et al. | |
| 6,357,519 B1 | 3/2002 | Ozaki et al. | |
| 6,439,300 B1 | 8/2002 | Falta et al. | |
| 6,523,606 B1* | 2/2003 | Dienhart et al. | F28D 1/05391 165/144 |
| 6,536,517 B2 | 3/2003 | Hoshino et al. | |
| 6,540,016 B1 | 4/2003 | Baldantoni | |
| 6,895,770 B1 | 5/2005 | Kaminski | |
| 6,964,296 B2 | 11/2005 | Memory et al. | |
| 7,036,561 B2 | 5/2006 | Yagi et al. | |
| 7,275,394 B2 | 10/2007 | Landberg | |
| 7,284,594 B2 | 10/2007 | Sanada et al. | |
| 7,360,309 B2 | 4/2008 | Vaidyanathan et al. | |
| 7,578,340 B2 | 8/2009 | Forster et al. | |
| 7,587,340 B2 | 8/2009 | Forster et al. | |
| 7,640,966 B2 | 1/2010 | Maeda et al. | |
| 7,669,557 B2 | 3/2010 | Kojima | |
| 7,721,794 B2 | 5/2010 | Heidenreich et al. | |
| 7,836,944 B2 | 11/2010 | Antonijevic et al. | |
| 8,365,809 B2 | 2/2013 | Sugimoto et al. | |
| 2002/0129929 A1 | 9/2002 | Iwasaki | |
| 2004/0182558 A1 | 9/2004 | Watanabe et al. | |
| 2004/0206490 A1* | 10/2004 | Katoh et al. | F25B 39/02 165/174 |
| 2005/0006067 A1 | 1/2005 | Hoglinger et al. | |
| 2005/0072562 A1 | 4/2005 | Hall | |
| 2005/0217839 A1 | 10/2005 | Papapanu | |
| 2005/0269062 A1 | 12/2005 | Guerrero et al. | |
| 2006/0053833 A1 | 3/2006 | Martins et al. | |
| 2006/0277940 A1 | 12/2006 | Jang et al. | |
| 2007/0163766 A1 | 7/2007 | Fischer et al. | |
| 2007/0227714 A1 | 10/2007 | Takeuchi et al. | |
| 2008/0023187 A1* | 1/2008 | Kirschenmann | F28D 1/0435 165/176 |
| 2008/0073061 A1 | 3/2008 | Dias et al. | |
| 2008/0078198 A1 | 4/2008 | Breiding et al. | |
| 2008/0229580 A1 | 9/2008 | Anderson et al. | |
| 2009/0025914 A1 | 1/2009 | Knight et al. | |
| 2009/0078399 A1 | 3/2009 | Makita et al. | |
| 2009/0114379 A1 | 5/2009 | Lim et al. | |
| 2009/0173479 A1 | 7/2009 | Huang et al. | |
| 2009/0211288 A1 | 8/2009 | Simeone et al. | |
| 2009/0211743 A1 | 8/2009 | Schrader et al. | |
| 2010/0012307 A1 | 1/2010 | Taras et al. | |
| 2010/0071868 A1 | 3/2010 | Reifel et al. | |
| 2010/0212874 A1 | 8/2010 | Min et al. | |
| 2010/0236766 A1 | 9/2010 | Ulics, Jr. et al. | |
| 2010/0270012 A1* | 10/2010 | Hur et al. | F28D 1/05391 165/173 |
| 2010/0326100 A1 | 12/2010 | Taras et al. | |
| 2011/0048689 A1 | 3/2011 | Johnson et al. | |
| 2011/0059523 A1 | 3/2011 | Knight | |
| 2011/0061844 A1 | 3/2011 | Jianlong et al. | |
| 2011/0073292 A1 | 3/2011 | Datta et al. | |
| 2011/0088885 A1* | 4/2011 | Samuelson et al. | F28D 1/05375 165/176 |
| 2011/0108260 A1 | 5/2011 | Alahyari et al. | |
| 2011/0120177 A1 | 5/2011 | Kirkwood et al. | |
| 2011/0139414 A1 | 6/2011 | Ghosh et al. | |
| 2011/0203780 A1 | 8/2011 | Jiang et al. | |
| 2012/0080173 A1 | 4/2012 | Koberstein et al. | |
| 2012/0168125 A1 | 7/2012 | Johnston et al. | |
| 2012/0222848 A1 | 9/2012 | Sicks et al. | |
| 2013/0023533 A1 | 1/2013 | Wunberg et al. | |
| 2015/0027677 A1 | 1/2015 | Taras et al. | |
| 2016/0290730 A1 | 10/2016 | Taras | |

FOREIGN PATENT DOCUMENTS

| | | |
|---|---|---|
| CN | 1119267 A | 3/1996 |
| CN | 1287607 A | 3/2001 |
| CN | 2709909 Y | 7/2005 |
| CN | 2754040 Y | 1/2006 |
| CN | 1877221 A | 12/2006 |
| CN | 101124038 A | 2/2008 |
| CN | 101298951 A | 11/2008 |
| CN | 201229094 Y | 4/2009 |
| CN | 101517349 A | 8/2009 |
| CN | 201387254 Y | 1/2010 |
| CN | 101706225 A | 5/2010 |
| CN | 101738010 A | 6/2010 |
| CN | 201764878 U | 3/2011 |
| CN | 102243028 A | 11/2011 |
| CN | 202109780 U | 1/2012 |
| CN | 202361699 U | 8/2012 |
| CN | 202648260 U | 1/2013 |
| DE | 102005004284 A1 | 8/2005 |
| DE | 102007035111 A1 | 1/2009 |
| DE | 10150213 A1 | 5/2013 |
| EP | 0096127 A1 | 12/1983 |
| EP | 0175836 | 4/1986 |
| EP | 0330701 A2 | 9/1989 |
| EP | 0962736 A2 | 12/1999 |
| EP | 1065453 A2 | 1/2001 |
| EP | 1111318 A1 | 6/2001 |
| EP | 1447636 A1 | 8/2004 |
| EP | 1657513 A1 | 5/2006 |
| EP | 1795847 A2 | 6/2007 |
| EP | 2336701 A2 | 6/2011 |
| EP | 2362176 A2 | 8/2011 |
| EP | 2372289 A2 | 10/2011 |
| EP | 1840494 A2 | 10/2013 |
| FR | 2798990 A1 | 3/2001 |
| FR | 2913490 A1 | 9/2008 |
| GB | 1355653 A | 6/1974 |
| GB | 1492408 A | 11/1977 |
| GB | 2356040 A | 5/2001 |
| JP | H1089874 A | 4/1998 |
| JP | H10300271 A | 11/1998 |
| JP | H11325790 A | 11/1999 |
| JP | 2000028228 A | 1/2000 |
| JP | 2001099593 A | 4/2001 |
| JP | 2006343088 A | 12/2006 |
| JP | 2007515777 A | 6/2007 |
| KR | 20020032818 A | 5/2002 |

(56) References Cited

FOREIGN PATENT DOCUMENTS

| | | |
|---|---|---|
| KR | 20040051645 A | 6/2004 |
| KR | 100697088 B1 | 3/2007 |
| KR | 20070120263 A | 12/2007 |
| KR | 20080008542 A | 1/2008 |
| KR | 20080021298 A | 3/2008 |
| WO | 9725079 A1 | 7/1997 |
| WO | 02068890 A1 | 9/2002 |
| WO | 2005003668 A2 | 1/2005 |
| WO | 2005015110 A1 | 2/2005 |
| WO | 2005100901 A1 | 10/2005 |
| WO | 2006035149 A1 | 4/2006 |
| WO | 2008042368 A1 | 4/2008 |
| WO | 2008105760 A2 | 9/2008 |
| WO | 2009078869 A1 | 6/2009 |
| WO | 2009105454 A2 | 8/2009 |
| WO | 2010019401 A2 | 2/2010 |
| WO | 2011025988 A2 | 3/2011 |
| WO | 2011034633 A1 | 3/2011 |
| WO | 2011041600 A1 | 4/2011 |
| WO | 2011042344 A2 | 4/2011 |
| WO | 2011069015 A2 | 6/2011 |
| WO | 2011139425 A2 | 11/2011 |

OTHER PUBLICATIONS

International Search Report for application PCT/US2013/071644 dated Feb. 19, 2014, 5 pages.
Written Opinion for application PCT/US2013/071644 dated Feb. 19, 2014, 5 pages.
CN Office Action with translation, Application No. 201380007736.5, dated Jan. 11, 2016, pp. 1-19.
CN Office Action with translation, Application No. 201380007736.5, dated Jan. 19, 2017, pp. 1-22.
CN Office Action with translation, Application No. 201380007736.5, dated Jul. 13, 2016, pp. 1-20.
IPRP; International Application No. PCT/US2013/071644; International Filing Date: Nov. 25, 2013; dated Jul. 28, 2015, pp. 1-6.
IPRP; International Application No. PCT/US2013/023533; International Filing Date: Jan. 29, 2013; dated Aug. 5, 2014, pp. 1-6.
International Search Report and Written Opinion for Application No. PCT/US2013/023533, dated Sep. 9, 2013, 9 Pages.
Chinese Office Action for application 201480064112.1, dated Nov. 3, 2017, 15 pages.
Chinese Office Action with translation for application CN 201380007736.5, dated Oct. 13, 2017, pp. 1-20.
CN Second Chinese Office Action and Search Report with translation for application CN 201380071389.2, dated Aug. 22, 2017, pp. 1-20.
International Search Report and Written Opinion for application PCT/US2014/057147, dated Jan. 23, 2015, 9 pages.
PCT International Preliminary Report on Patentability; International Application No. PCT/US2014/057147; International Filing Date: Sep. 24, 2014, dated May 31, 2016, pp. 1-6.
U.S. Office Action; U.S. Appl. No. 14/376,195; Final Office Action; dated Dec. 15, 2017, pp. 1-24, dated May 6, 2018.
U.S. Office Action; U.S. Appl. No. 14/376,195; Non-Final Office Action; dated Jul. 13, 2017, pp. 1-22.
U.S. Office Action; U.S. Appl. No. 15/039,087; Non-Final Office Action; dated Nov. 2, 2017, pp. 1-53.
Chinese Fourth Office Action with English Translation; CN Application No. 201380071389.2; dated Jul. 13, 2018; pp. 1-6.
Second Office Action for Chinese Patent Application No. 201480064112.1, dated Jun. 8, 2018, with English Translation (21 pages).

\* cited by examiner

MULTIPLE TUBE BANK HEAT EXCHANGE UNIT WITH MANIFOLD ASSEMBLY

BACKGROUND OF THE INVENTION

This invention relates generally to heat exchangers and, more particularly, to multiple tube bank heat exchange unit incorporating a manifold assembly.

Heat exchangers have long been used as evaporators and condensers in heating, ventilation, air conditioning and refrigeration (HVACR) applications. Historically, these heat exchangers have been round tube and plate fin (RTPF) heat exchangers. However, all aluminum flattened tube serpentine fin heat exchangers are finding increasingly wider use in industry, including the HVACR industry, due to their compactness, thermal-hydraulic performance, structural rigidity, lower weight and reduced refrigerant charge, in comparison to conventional RTPF heat exchangers. Flattened tubes commonly used in HVACR applications typically have an interior subdivided into a plurality of parallel flow channels. Such flattened tubes are commonly referred to in the art as multi-channel tubes, mini-channel tubes or micro-channel tubes.

A typical flattened tube serpentine fin heat exchanger includes a first manifold, a second manifold, and a single tube bank formed of a plurality of longitudinally extending flattened heat exchange tubes disposed in spaced parallel relationship and extending between the first manifold and the second manifold. The first manifold, second manifold and tube bank assembly is commonly referred to in the heat exchanger art as a slab. Additionally, a plurality of fins are disposed between the neighboring pairs of heat exchange tubes for increasing heat transfer between a fluid, commonly air in HVACR applications, flowing over the outside surfaces of the flattened tubes and along the fin surfaces and a fluid, commonly refrigerant in HVACR applications, flowing inside the flattened tubes. Such single tube bank heat exchangers, also known as single slab heat exchangers, have a pure cross-flow configuration.

Double bank flattened tube and serpentine fin heat exchangers are also known in the art. Conventional double bank flattened tube and serpentine fin heat exchangers are typically formed of two conventional fin and tube slabs, one spaced behind the other, with fluid communication between the manifolds accomplished through external piping. However, to connect the two slabs in fluid flow communication in other than a parallel cross-flow arrangement requires complex external piping. For example, U.S. Pat. No. 6,964,296 B2 and U.S. Patent Application Publication 2009/0025914 A1 disclose embodiments of double bank, multi-channel flattened tube heat exchanger.

SUMMARY OF THE INVENTION

In an aspect, a multiple bank, flattened tube heat exchange unit includes a first tube bank including a plurality of flattened tube segments extending longitudinally in spaced parallel relationship between a first manifold and a second manifold and a second tube bank including a plurality of flattened tube segments extending longitudinally in spaced parallel relationship between a first manifold and a second manifold, the second tube bank disposed behind the first tube bank. The second manifold of the first tube bank and the second manifold of the second tube bank form a manifold assembly wherein an interior volume of the second manifold of the first tube bank and an interior volume of the second manifold of the second tube bank of the manifold assembly are connected in fluid communication internally, that is not through external piping.

BRIEF DESCRIPTION OF THE DRAWINGS

For further understanding of the disclosure, reference will be made to the following detailed description which is to be read in connection with the accompanying drawing, where.

DETAILED DESCRIPTION

Figure 1:
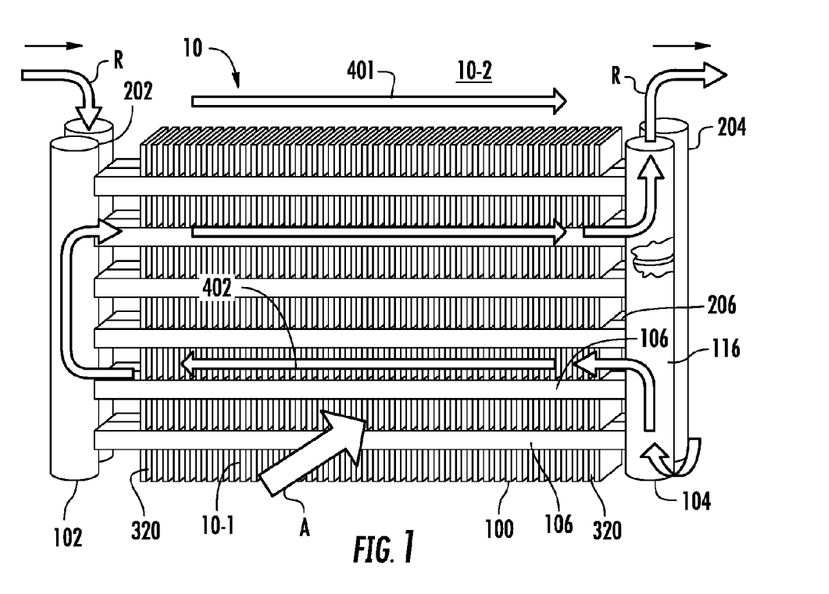
FIG. 1 is a diagrammatic illustration of an embodiment of a multiple tube bank, flattened tube finned heat exchange unit as disclosed herein.

An exemplary embodiment of a multiple bank flattened tube finned heat exchanger unit in accordance with the disclosure, generally designated 10, is depicted in perspective illustration in FIG. 1. As depicted therein, the multiple bank flattened tube finned heat exchanger 10 includes a first tube bank 100 and a second tube bank 200 that is disposed behind the first tube bank 100, that is downstream with respect to air flow, A, through the heat exchanger. The first tube bank 100 may also be referred to herein as the front heat exchanger slab 100 and the second tube bank 200 may also be referred to herein as the rear heat exchanger slab 200.

The first tube bank 100 includes a first manifold 102, a second manifold 104 spaced apart from the first manifold 102, and a plurality of heat exchange tube segments 106, including at least a first and a second tube segment, extending longitudinally in spaced parallel relationship between and connecting the first manifold 102 and the second manifold 104 in fluid communication. The second tube bank 200 includes a first manifold 202, a second manifold 204 spaced apart from the first manifold 202, and a plurality of heat exchange tube segments 206, including at least a first and a second tube segment, extending longitudinally in spaced parallel relationship between and connecting the first manifold 202 and the second manifold 204 in fluid communication. As will be described in further detail herein later, each set of manifolds 102, 202 and 104, 204 disposed at either side of the dual bank heat exchanger 10 may comprise separate paired manifolds, may comprise separate chambers within an integral one-piece folded manifold assembly or may comprise separate chambers within an integral fabricated (e.g. extruded, drawn, rolled and welded) manifold assembly. Each tube bank 100, 200 may further include "dummy" tubes (not shown) extending between its first and second manifolds at the top of the tube bank and at the bottom of the tube bank. These "dummy" tubes do not convey refrigerant flow, but add structural support to the tube bank and protect the uppermost and lowermost fins.

Figure 2:
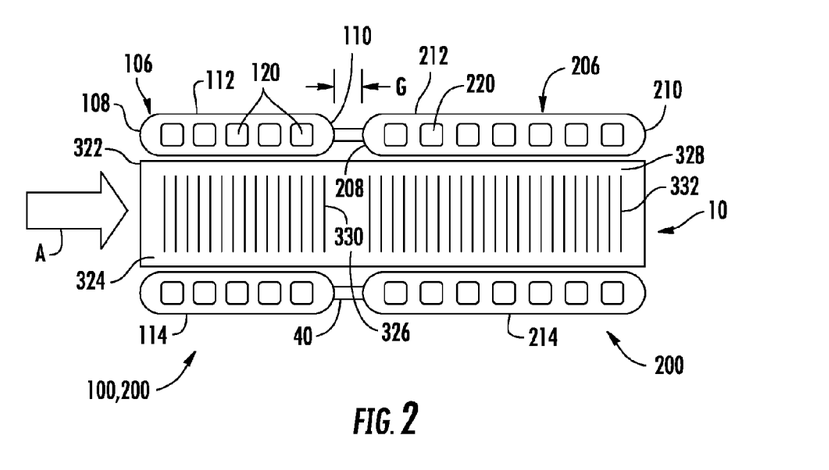
FIG. 2 is a side elevation view, partly in section, illustrating an embodiment of a fin and a set of integral flattened tube segment assemblies of the heat exchange unit of FIG. 1.

Referring now to FIG. 2, each of the heat exchange tube segments 106, 206 comprises a flattened heat exchange tube having a leading edge 108, 208, a trailing edge 110, 210, an upper surface 112, 212, and a lower surface 114, 214. The leading edge 108, 208 of each heat exchange tube segment 106, 206 is upstream of its respective trailing edge 110, 210 with respect to airflow through the heat exchanger 10. In the embodiment depicted in FIG. 2, the respective leading and trailing portions of the flattened tube segments 106, 206 are rounded thereby providing blunt leading edges 108, 208 and trailing edges 110, 210. However, it is to be understood that the respective leading and trailing portions of the flattened tube segments 106, 206 may be formed in other configurations.

The interior flow passage of each of the heat exchange tube segments 106, 206 of the first and second tube banks 100, 200, respectively, may be divided by interior walls into a plurality of discrete flow channels 120, 220 that extend longitudinally the length of the tube from an inlet end of the tube to an outlet end of the tube and establish fluid communication between the respective headers of the first and the second tube banks 100, 200. In the embodiment of the multi-channel heat exchange tube segments 106, 206 depicted in FIG. 2, the heat exchange tube segments 206 of the second tube bank 200 have a greater width than the heat exchange tube segments 106 of the first tube bank 100. Also, the interior flow passages of the wider heat exchange tube segments 206 may be divided into a greater number of discrete flow channels 220 than the number of discrete flow channels 120 into which the interior flow passages of the heat exchange tube segments 106 are divided. The flow channels 120, 220 may have a circular cross-section, a rectangular cross-section or other non-circular cross-section.

The second tube bank 200, i.e. the rear heat exchanger slab, is disposed behind the first tube bank 100, i.e. the front heat exchanger slab, with respect to the airflow direction, with each heat exchange tube segment 106 directly aligned with a respective heat exchange tube segment 206 and with the leading edges 208 of the heat exchange tube segments 206 of the second tube bank 200 spaced from the trailing edges 110 of the heat exchange tube segments of the first tube bank 100 by a desired spacing, G. A spacer or a plurality of spacers disposed at longitudinally spaced intervals may be provided between the trailing edges 110 of the heat exchange tube segments 106 and the leading edges 208 of the heat exchange tube segments 206 to maintain the desired spacing, G, during brazing of the preassembled heat exchanger unit 10 in a brazing furnace.

In the embodiment depicted in FIG. 2, an elongated web 40 or a plurality of spaced web members 40 span the desired spacing, G, along at least of portion of the length of each aligned set of heat exchange tube segments 106, 206. For a further description of a dual bank, flattened tube finned heat exchanger unit wherein the heat exchange tubes 106 of the first tube bank 100 and the heat exchange tubes 206 of the second tube bank 200 are connected by an elongated web or a plurality of web members, reference is made to U.S. provisional application Ser. No. 61/593,979, filed Feb. 2, 2012, the entire disclosure of which is hereby incorporated herein by reference.

Referring still to FIGS. 1 and 2, the flattened tube finned heat exchanger 10 disclosed herein further includes a plurality of folded fins 320. Each folded fin 320 is formed of a single continuous strip of fin material tightly folded in a ribbon-like serpentine fashion thereby providing a plurality of closely spaced fins 322 that extend generally orthogonal to the flattened heat exchange tubes 106, 206. Typically, the fin density of the closely spaced fins 322 of each continuous folded fin 320 may be about 16 to 25 fins per inch, but higher or lower fin densities may also be used. Heat exchange between the refrigerant flow, R, and air flow, A, occurs through the outside surfaces 112, 114 and 212, 214, respectively, of the heat exchange tube segments 106, 206, collectively forming the primary heat exchange surface, and also through the heat exchange surface of the fins 322 of the folded fin 320, which forms the secondary heat exchange surface.

In the depicted embodiment, the depth of each of the ribbon-like folded fin 320 extends at least from the leading edge 108 of the first tube bank 100 to the trailing edge of 210 of the second bank 200, and may overhang the leading edge 108 of the first tube bank 100 or/and trailing edge 208 of the second tube bank 200 as desired. Thus, when a folded fin 320 is installed between a set of adjacent multiple tube, flattened heat exchange tube assemblies 240 in the array of tube assemblies of the assembled heat exchanger 10, a first section 324 of each fin 322 is disposed within the first tube bank 100, a second section 326 of each fin 322 spans the spacing, G, between the trailing edge 110 of the first tube bank 100 and the leading edge 208 of the second tube bank 200, and a third section 328 of each fin 322 is disposed within the second tube bank 200. In an embodiment, each fin 322 of the folded fin 320 may be provided with louvers 330, 332 formed in the first and third sections, respectively, of each fin 322.

The multiple bank, flattened tube heat exchange unit 10 disclosed herein is depicted in a cross-counterflow arrangement wherein refrigerant (labeled "R") from a refrigerant circuit (not shown) of a refrigerant vapor compression system (not shown) passes through the manifolds and heat exchange tube segments of the tube banks 100, 200, in a manner to be described in further detail hereinafter, in heat exchange relationship with a cooling media, most commonly ambient air, flowing through the airside of the heat exchanger 10 in the direction indicated by the arrow labeled "A" that passes over the outside surfaces of the heat exchange tube segments 106, 206 and the surfaces of the folded fin strips 320. The air flow first passes transversely across the upper and lower horizontal surfaces 112, 114 of the heat exchange tube segments 106 of the first tube bank, and then passes transversely across the upper and lower horizontal surfaces 212, 214 of the heat exchange tube segments 206 of the second tube bank 200. The refrigerant passes in cross-counterflow arrangement to the airflow, in that the refrigerant flow passes first through the second tube bank 200 and then through the first tube bank 100. The multiple tube bank, flattened tube finned heat exchanger 10 having a cross-counterflow circuit arrangement yields superior heat exchange performance, as compared to the cross-flow or cross-parallel flow circuit arrangements, as well as allows for flexibility to manage the refrigerant side pressure drop via implementation of tubes of various widths within the first tube bank 100 and the second tube bank 200.

Figure 3:
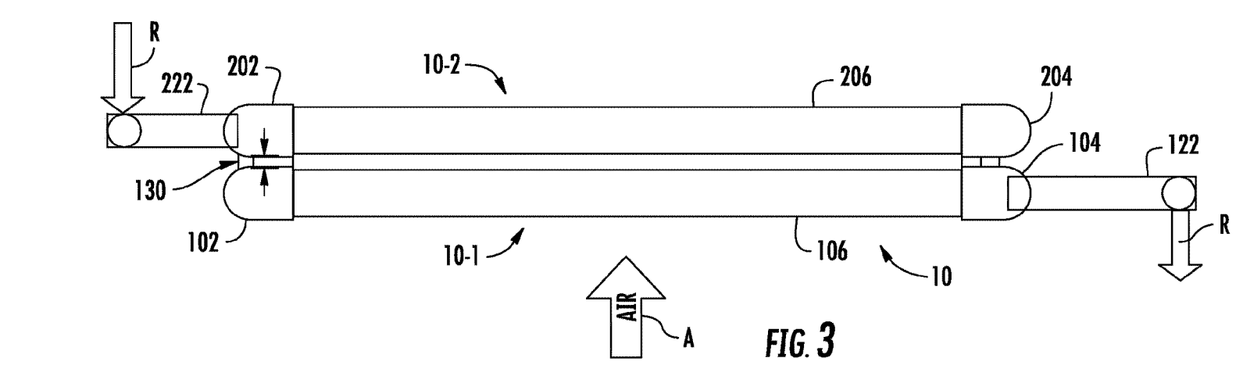
FIG. 3 is a top plan view of an embodiment single pass, multiple pass counter crossflow embodiment of the heat exchange unit of FIG. 1.

In the embodiment depicted in FIGS. 1 and 3, the second tube bank 200, i.e. the rear heat exchanger slab with respect to air flow, has a single-pass refrigerant circuit configuration and the first tube bank 100, i.e. the front heat exchanger slab with respect to air flow, has a two pass configuration. Refrigerant flow passes from a refrigerant circuit (not shown) into the first manifold 202 of the second tube bank 200 through at least one refrigerant inlet 222 (FIG. 3), passes through the heat exchange tube segments 206 into the second manifold 204 of the second tube bank 200, then passes into the second manifold 104 of the first tube bank 100, thence through a lower set of the heat exchange segments 106 into the first manifold 102 of the first tube bank 100, thence back to the second manifold 104 through an upper set of the heat exchange tubes 106, and thence passes back to the refrigerant circuit through at least one refrigerant outlet 122.

Figure 4:
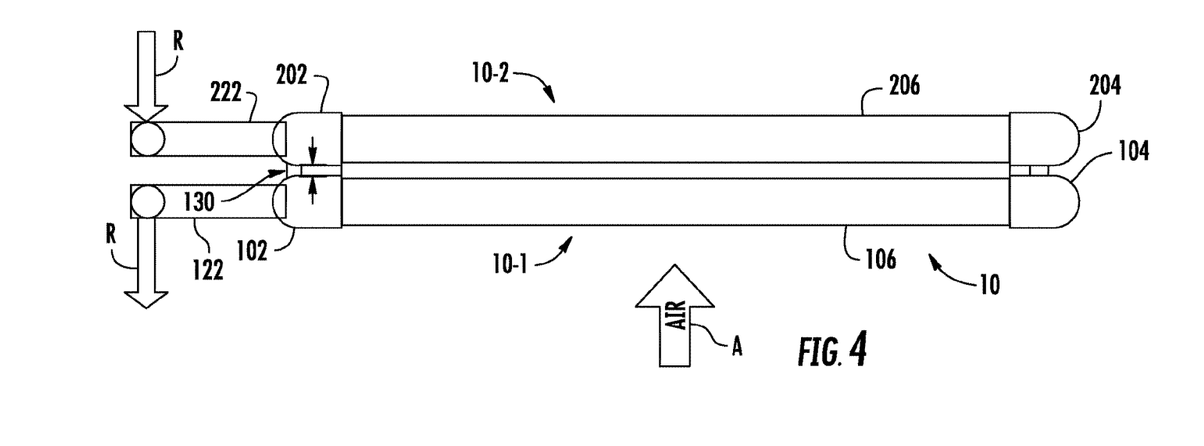
FIG. 4 is a top plan view of an embodiment single pass, single pass counter crossflow embodiment of the heat exchange unit of FIG. 1.

In the embodiment depicted in FIG. 4, the second tube bank 200, i.e., the rear heat exchanger slab with respect to air flow, has a single-pass refrigerant circuit configuration and the first tube bank 100, i.e. the front heat exchanger slab with respect to air flow, also has a single pass configuration. Refrigerant flow passes from a refrigerant circuit (not shown) into the first manifold 202 of the second tube bank 200 through at least one refrigerant inlet 222, passes through the heat exchange tube segments 206 into the second manifold 204 of the second tube bank 200, then passes into the second manifold 104 of the first tube bank 100, thence passes through the heat exchange segments 106 into the first manifold 102 of the first tube bank 100, and thence passes back to the refrigerant circuit through at least one refrigerant outlet 122.

In the embodiments depicted in FIGS. 1, 3 and 4, the neighboring second manifolds 104 and 204 are connected in fluid flow communication such that refrigerant may flow from the interior of the second manifold 204 of the second tube bank 200 into the interior of the second manifold 104 of the first tube bank 100. In an embodiment, the second manifold 104 of the first tube bank 100 has a plurality of longitudinally aligned ports, e.g., holes 244 (FIG. 5), drilled, milled or punched through the wall thereof and disposed at longitudinally spaced intervals. Similarly, the second manifold 204 of the second tube bank 200 has a plurality of longitudinally aligned ports, e.g., holes 246 (FIG. 5), equal in number to the plurality of holes 244 in the second manifold 104 of the first tube bank 100, drilled, milled or punched through the wall thereof and disposed at longitudinally spaced intervals. Each port 244 forms a flow passage through the wall of the second manifold 104 and each port 246 forms a flow passage through the wall of the second manifold 204. When the heat exchanger unit 10 is assembled, each flow passage, i.e. port 246, in the second manifold 204 aligns with a respective one of the flow passages, i.e. port 244, of the first manifold 104. It should be understood that the ports 244, 246 may be holes of the same size, however certain design configuration may benefit of the holes being of different sizes.

Figure 5:
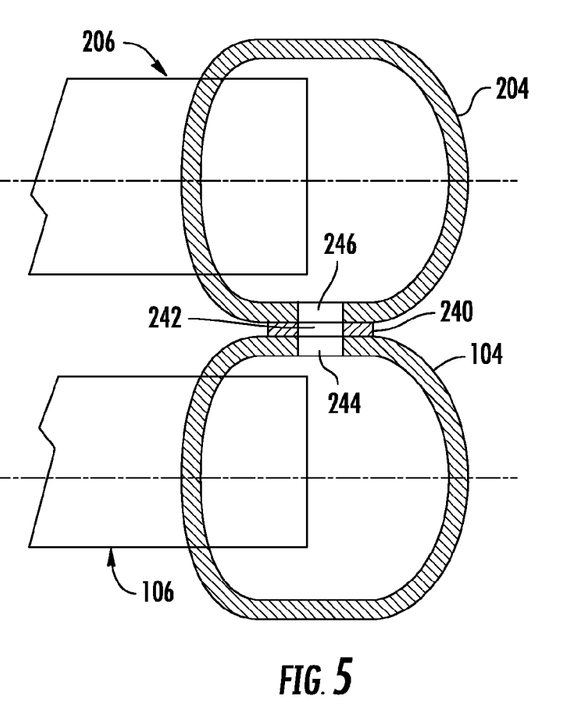
FIG. 5 is a sectioned plan view of an embodiment of a manifold assembly of paired generally D-shaped tubular manifolds at the intermediate side of the heat exchanger unit of FIG. 1 connected in fluid communication through a block insert disposed therebetween.

In the embodiment depicted in FIG. 5, a block insert 240 having a central passage 242 extending longitudinally therethrough is positioned between the manifolds 104 and 204 is positioned such that the central passage 242 aligns with ports 244 and 246 formed through the respective walls of the manifolds 104 and 204, respectively, and spans the longitudinally expanse of the longitudinally spaced ports 244 and 246. So assembled, a plurality of continuous flow passages are established through which refrigerant may pass from the interior of the second manifold 204 of the second tube bank 200 through the port 246, thence through the central passage 242 of the block insert 240, and thence through the port 244 into the interior of the second manifold 104 of the first tube bank 100. In this embodiment, the block insert 240 may comprise a longitudinally elongated block having a single longitudinally extending slot forming a longitudinally elongated central passage 242 that interfaces with all of the plurality of ports 244 and 246. Alternatively, a longitudinally elongated central passage 242 that interfaces with ports 244 and 246 may be represented by a plurality of slots, each slot spanning only a portion of the aligned ports 244 and 246. In the embodiment depicted in FIG. 5, the first and second manifolds 104, 204 are both generally D-shaped manifolds disposed in back-to-back spaced relationship with a generally rectangular block insert 242 disposed between the first and second manifolds 104, 204.

Figure 6:
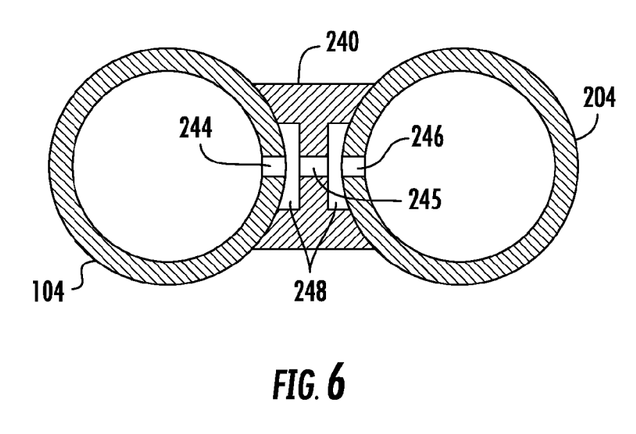
FIG. 6 is a sectioned plan view of an embodiment of a manifold assembly of paired generally cylindrical tubular manifolds at the intermediate side of the heat exchanger unit of FIG. 1 connected in fluid communication through a block insert disposed therebetween.

In the embodiment depicted in FIG. 6, the first and second manifolds 104, 106 are both cylindrical manifolds disposed in side-to-side spaced relationship with a contoured block insert 240. In this embodiment, the side faces 248 of the block insert 240 are contoured concave inwardly to match and mate with the contour of the external surface of the respective abutting second manifolds. In this embodiment, the block insert 240 may comprise a longitudinally elongated block having a pair of laterally spaced, longitudinally extending slots forming longitudinally elongated flow passages 248 and having a plurality of longitudinally spaced bores 245 interconnecting the laterally spaced flow passages 248 in fluid communication. The bores 245 may be disposed in alignment with the ports 244 and 246 in the first and second manifolds 104, 204, respectively. In either of the embodiments depicted in FIGS. 5 and 6, the block insert 240 is metallurgically bonded, for example by brazing or welding, to each of the second manifolds 104 and 204. It should be understood that brazing can be accomplished during furnace brazing of the entire heat exchanger construction.

Figure 7:
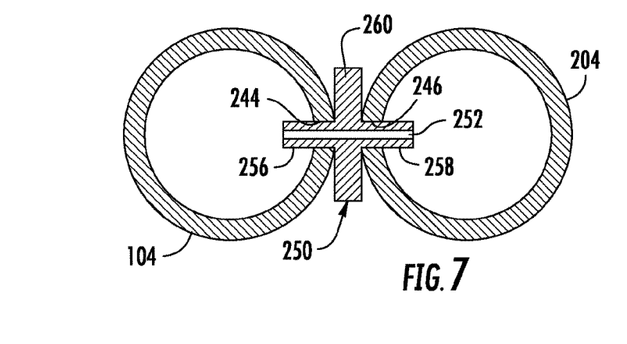
FIG. 7 is a sectioned plan view of an embodiment of a manifold assembly of paired generally cylindrical tubular manifolds at the intermediate side of the heat exchanger unit of FIG. 1 connected in fluid communication through a plurality of individual tubular members extending therebetween.
Figure 8:
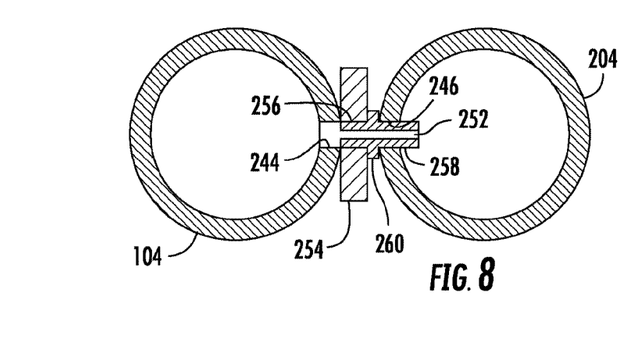
FIG. 8 is a sectioned plan view of another embodiment of a manifold assembly of paired generally tubular manifolds at the intermediate side of the heat exchanger unit of FIG. 1 connected in fluid communication through a plurality of individual tubular members extending therebetween.

In the embodiments depicted in FIGS. 7 and 8, the second manifolds 104 and 204 are connected in fluid communication through a plurality of individual tubular members 250 interconnecting the plurality of aligned pairs of ports 244 and 246 in the first and second manifolds 104, 204, respectively. Each tubular member 250 extends through a respective one of the plurality of longitudinally spaced sets of aligned ports 244 and 246, whereby each tubular member forms a flow passage 252 between the interior of the second manifold 204 of the second tube bank 200 and the interior of the second manifold 104 of the first tube bank 100. In the embodiments as depicted in FIGS. 7 and 8, the tubular member 250 has a tubular first end 256 and a tubular second end 258 and a radially outwardly directed flange 260 extending circumferentially about a mid-portion of the tubular member 250 between the first end 256 and the second end 258. In the embodiment as depicted in FIG. 7, the first end 256 extends through a port 244 in the manifold 104 and the second end 258 extends through a port 246 in the manifold 24 and each tubular member 250 may be metallurgically bonded to the manifolds 104 and 204, for example by brazing during brazing of the entire heat exchanger assembly in a brazing furnace. Additionally, the thickness of the flange 260 may be sized to ensure a desired spacing between the second manifolds 104 and 204.

In the embodiment depicted in FIG. 8, the first end 256 of each tubular member 250 is threaded and is inserted into a respective one of a plurality of threaded sockets provided in a longitudinally extending block 254. Each socket is aligned with a respective one of the ports 244 in the manifold 104. The second end 258 of each tubular member 250 is inserted into a respective one of the ports 246 in the manifold 204. The block 254 and the second end 258 are metallurgically bonded to the manifold 104 and the manifold 204, respectively, for example by brazing during brazing of the entire heat exchanger assembly in a brazing furnace. In this embodiment, the flange 260 may be hexagonal, octagonal or otherwise shaped to accommodate a wrench or other tool by which the tubular member 250 may be screwed into a respective one of the threaded holes of the longitudinally extended block 254.

In each of the embodiments depicted in FIGS. 5-8, the paired tubular manifolds 104 and 204 in fluid communication through the plurality of longitudinally spaced, aligned and interfacing sets of ports 244 and 246 that are connected through a passage or passages provided in one or more inserts 240, 260 disposed between and brazed to the paired manifolds 104, 204, rather than being connected via external piping. The size, number and spacing of the ports 244, 246, as well as the thickness of the wall of the tubular manifolds 104, 204, may be selected to satisfy structural considerations. The cross-sectional area of the ports 244, 246 may be sized to satisfy thermo-hydraulic considerations.

Figure 9:
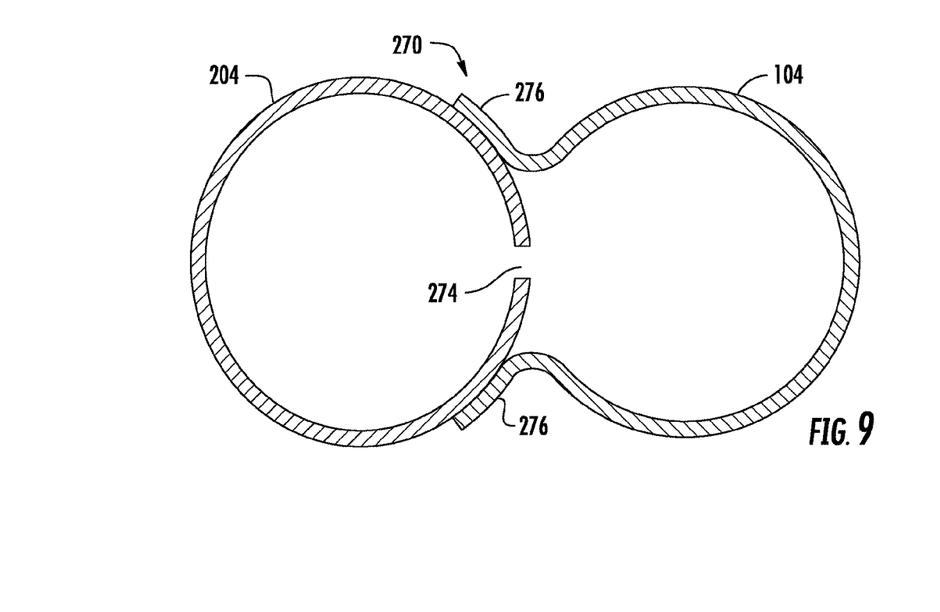
FIG. 9 is a sectioned plan view of another embodiment of a manifold assembly of a full tubular manifold and a partially open tubular manifold disposed in interfacing abutting relationship at the intermediate side of the heat exchanger unit of FIG. 1.

Referring now to FIG. 9, there is depicted an embodiment of a fabricated integral manifold assembly 270 wherein one of the second manifolds 104, 204 is a full tubular manifold and the other of the second manifolds 104, 204 is a partially tubular manifold being open longitudinally along its entire length over a sector of the circumference of the manifold. The fully tubular manifold, shown in FIG. 9 as being the second manifold 204 of the second manifold 200, has a plurality of longitudinally aligned holes or slots 274 drilled, milled or punched through the wall thereof and disposed at longitudinally spaced intervals. The partially tubular manifold, shown in FIG. 9 as being the second manifold 104 of the first manifold 100, is disposed side-by-side along the fully tubular manifold 204 with the longitudinally open sector straddling the plurality of holes or slots 274 machined through the wall of the second manifold 204 there by establishing fluid flow communication between the respective interior chambers of the second manifolds 104 and 204.

The partially tubular manifold and the fully tubular manifold are metallurgically bonded, such as by brazing or welding, along the interfaces of the partially tubular manifold with the fully tubular manifold to form the integral manifold assembly 270. A conventional roll and weld process may be used for both the fully tubular manifold and the partially tubular manifold. The longitudinal sides 276 extending along the open sector of the partially tubular manifold may be flared outwardly and contoured to provide a mating interface with the fully tubular manifold.

Figure 10A:
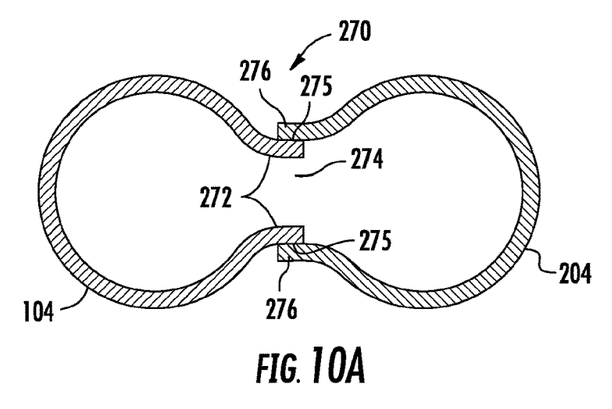
FIGS. 10A and 10B are sectioned plan views of alternate embodiments of a manifold assembly of paired partially open tubular manifolds joined in engaging relationship at the intermediate side of the heat exchanger unit of FIG. 1.
Figure 10B:
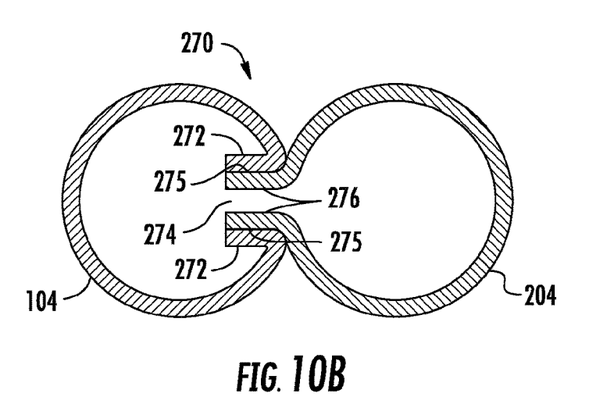
Figure 11:
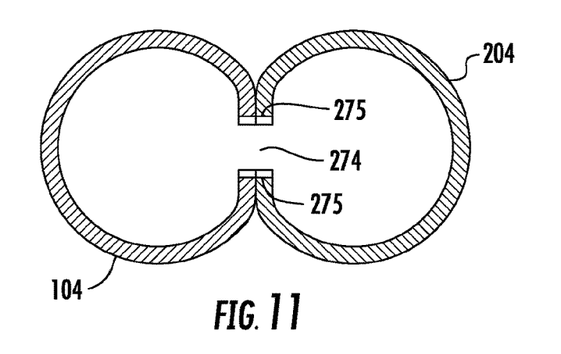
FIG. 11 is a sectioned plan view of another embodiment of a manifold assembly of paired partially open tubular manifolds joined in interfacing abutting relationship at the intermediate side of the heat exchanger unit of FIG. 1.

Referring now to FIGS. 10-11, there are depicted various exemplary embodiments of a fabricated integral manifold assembly 270 wherein at least one or both of the second manifolds 104, 204 comprises a partially tubular manifold being open longitudinally along its entire length or a portion of the entire length over a sector of the circumference/perimeter of the manifold. The two manifolds 104, 204, which may be formed by extrusion, are metallurgically bonded together along a brazing joint 275 to form the fabricated integral manifold assembly 270. In the embodiments shown in FIGS. 10A and 10B, the manifolds 104 and 204 are extruded with flanges 272 and 276, respectively, flanking their respective longitudinally extending open portions. The manifolds 104 and 204 are assembled together with the flanges of one of the manifolds 104, 204 inserted within the flanges of the other of the manifolds 104, 204 to interface along a joint 275 and to form a flow passage 274 interconnecting the respective interiors of the manifolds 104, 204. The manifolds 104, 204 can be metallurgically bonded together along the joint 275 by brazing during brazing of the entire heat exchanger assembly in a brazing furnace. In an embodiment, both of the manifolds 104, 204 are extruded as partially tubular manifolds being open longitudinally along its entire length over a sector of the circumference/perimeter of the manifold. In an embodiment, one of the manifolds, i.e. the manifold 104 in FIG. 10A and the manifold 204 in FIG. 10B, is extruded as a circumferentially closed tubular member having a plurality of longitudinally spaced, aligned holes that are disposed in fluid communication with the open sector of the other manifold when the heat exchanger is assembled prior to brazing the entire heat exchanger assembly.

In the embodiment of the fabricated integral manifold assembly 270 depicted in FIG. 11, the two manifolds 104, 204 are assembled in abutting relationship with their respective open portions facing each other to form a flow passage 274 and with their wall portions flanking their respective open portions interfacing along joints 275 along which the manifolds 104, 204 are metallurgically bonded together along the joint 275 by brazing during brazing of the entire heat exchanger assembly in a brazing furnace. In another embodiment of the fabricated integral manifold assembly depicted in FIG. 11, one or both of the manifolds 104, 204 may be formed as a fully closed tubular member having a plurality of longitudinally spaced, aligned holes instead of being a partially open tubular manifold having a open sector extending the length thereof.

Figure 12:
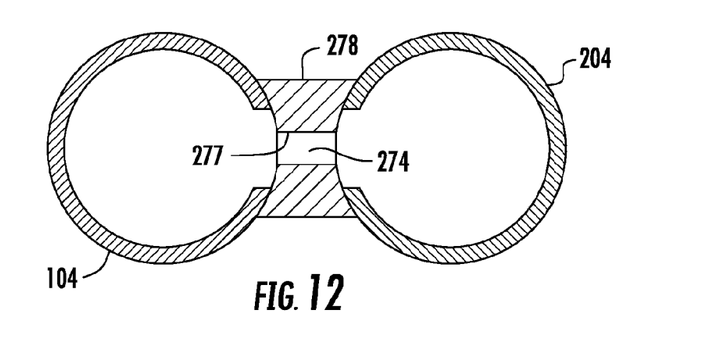
FIG. 12 is a sectioned plan view of an embodiment of a manifold assembly of paired partially open tubular manifolds interconnected in fluid communication through a flow passage through a single block insert disposed between the manifolds.
Figure 13:
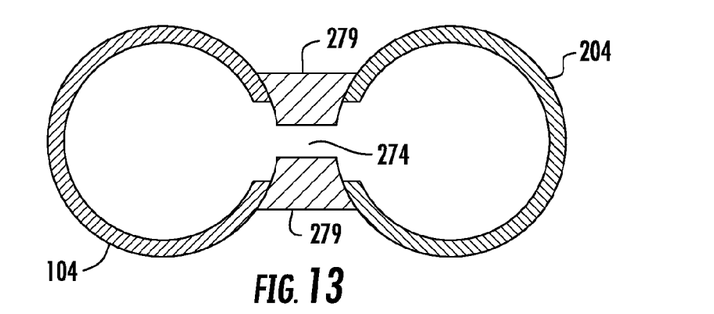
FIG. 13 is a sectioned plan view of an embodiment of a manifold assembly of paired partially open tubular manifolds interconnected in fluid communication through a flow passage formed by two block inserts.
Figure 14:
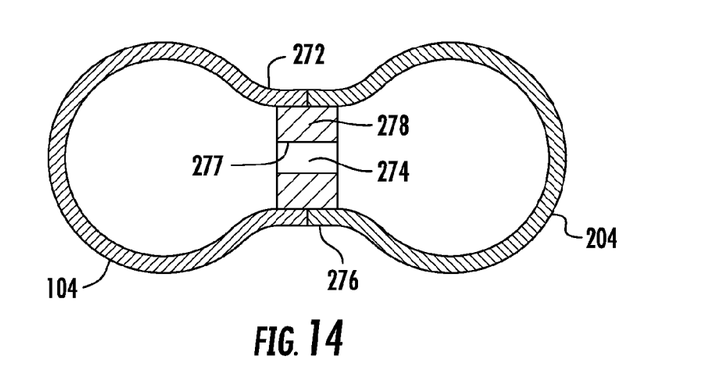
FIG. 14 is a sectioned plan view of an embodiment of a manifold assembly of paired partially open tubular manifolds interconnected in fluid communication through a flow passage through a block insert disposed internally at the interface between the manifolds.

Referring now to FIGS. 12-14, there are depicted embodiments of a fabricated integral manifold assembly 270 wherein both of the manifolds 104, 204 are formed as partially open tubular manifolds being open longitudinally along its entire length over a sector of the circumference/perimeter of the manifold. In the embodiment of the fabricated integral manifold assembly 270 depicted in FIGS. 12 and 13, the two manifolds 104, 204 are assembled in spaced relationship with their respective open portions facing each other. In the embodiment depicted in FIG. 12, a longitudinally extending block insert 278 having a plurality of bores 277 extending transversely therethrough is disposed between the two manifolds 104, 204 to form a plurality of flow passages 274 between the interiors of the manifolds 104, 204. The block insert 278 is brazed to the interfacing outer wall portions of the manifolds 104, 204 to form joints 275. In the embodiment of the fabricated integral manifold assembly 270 depicted in FIG. 13, a pair of longitudinally extending block inserts 279 is disposed in spaced relationship between the spaced open manifolds 104, 204 so as to form a flow passage 274 between the interiors of the manifolds 104, 204. The block inserts 279 are brazed to the interfacing wall portions of the manifolds 104, 204 to form joints 275. In the embodiment depicted in FIG. 14, a longitudinally extending block insert 278 having a plurality of longitudinally spaced bores 277 extending transversely therethrough is disposed internally between the respective flanges 272, 276 of the two manifolds 104, 204 to form a plurality of flow passages 274 between the interiors of the manifolds 104, 204. The block insert 278 is brazed to the interfacing inner wall portion of the flanges of the manifolds 104, 204.

Figure 15:
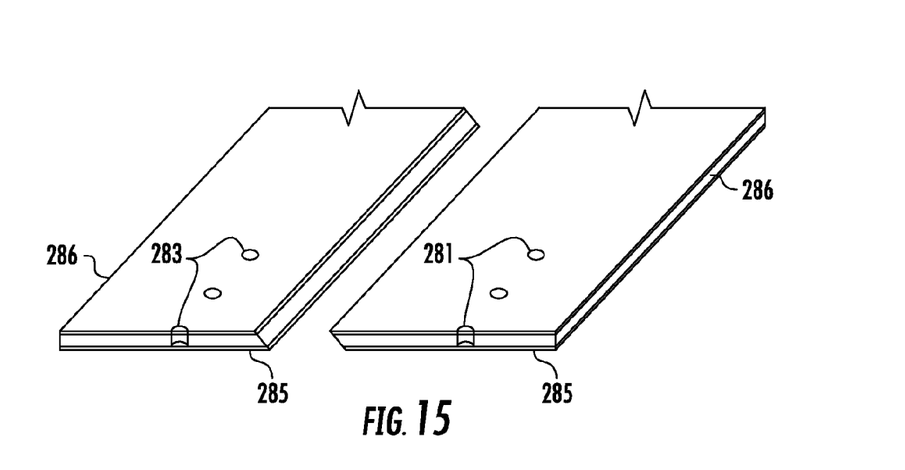
FIG. 15 is a perspective view of a cladded sheet from which an integral folded manifold assembly may be formed.

The manifold assembly disclosed herein may also be formed from a single metal sheet as an integral folded manifold assembly. Referring to a FIG. 15, the single sheet 286 of aluminum alloy from which the integral folded manifold assembly is formed is clad with a layer 285 of suitable brazing alloy and provided with a plurality of first ports 281 and a plurality of second ports 283. The ports 281 and 283 may comprise pre-drilled, pre-milled or pre-punched round holes or pre-fabricated elliptical, racetrack, rectangular, triangular or any other cross-section suitable for a particular manufacturing process and heat exchanger design configuration. To form the integral folded manifold assembly 280, the sheet 286 is folded upon itself such as the wall portions 282, 284 interface in side-by-side relationship such as illustrated in FIG. 10 or in FIG. 11, whereby each one of the plurality of first ports 281 registers with a corresponding one of the plurality of second ports 283. The interfacing surfaces of the cladded wall portions 282 and 284 are metallurgically bonded together when the assembled heat exchanger unit 10 is brazed in the brazing furnace, for example a controlled atmosphere brazing furnace.

Figure 16:
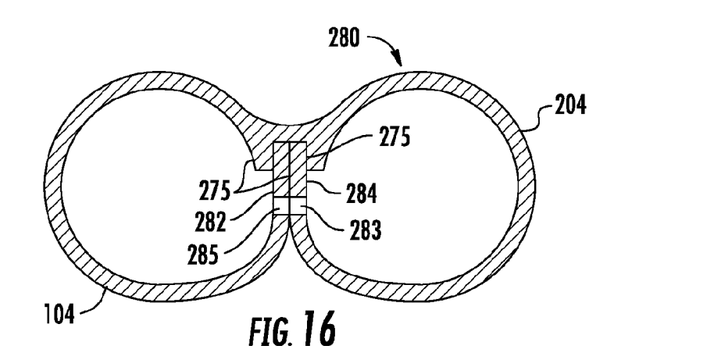
FIG. 16 is a sectioned plan view of an embodiment of a generally tubular integral folded manifold assembly formed of a single folded sheet.
Figure 17:
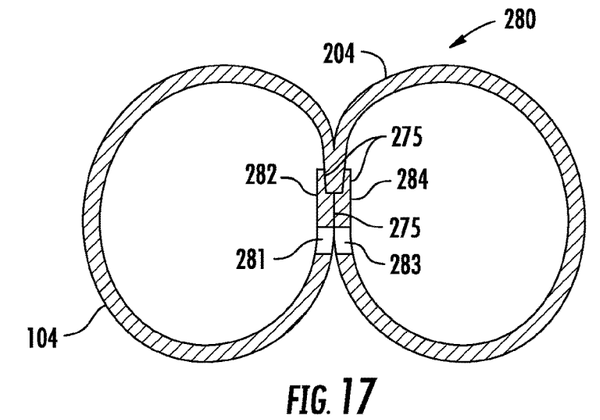
FIG. 17 is a sectioned plan view of another embodiment of a generally tubular integral folded manifold assembly formed of a single folded sheet.
Figure 18:
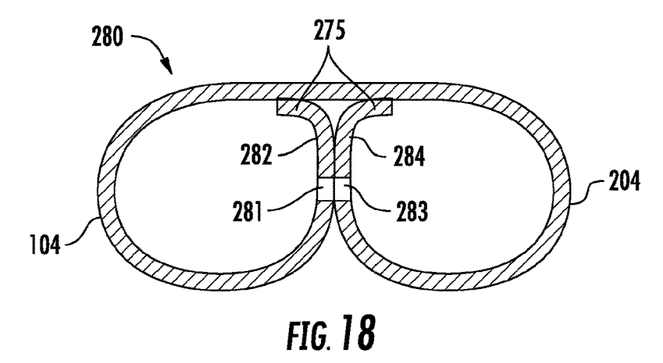
FIG. 18 is a sectioned plan view of another embodiment of a generally tubular integral folded manifold assembly formed of a single folded sheet.

Referring now to FIGS. 16, 17 and 18, there are depicted various exemplary embodiments of an integral folded manifold assembly 280 formed from a single folded sheet 286. The first manifold 104 and the second manifold 204 are formed in an integral folded manifold assembly 280 with respective wall portions 282, 284 of the manifolds 104, 204 disposed in interfacing side-by-side abutting relationship with a plurality of first ports 281 formed in the wall portion 282 being in registration with a similar plurality of second ports 283 formed in the interfacing wall portion 284. The respective pairs of aligned ports 281 and 283 form flow passages establishing internal fluid flow communication through which refrigerant may pass from the second manifold 204 into the first manifold 104. In each embodiment depicted in FIGS. 16, 17 and 18, the integral folded manifold assembly 280 is formed by folding a single sheet 286 of clad aluminum alloy onto itself and metallurgically bonding the overlapping or abutting portions of the folded sheet to each other along a brazing joint 275. This allows for a single braze operation of the manifold and heat exchanger core during the furnace braze process. Furthermore, one set of the first ports 281 or second ports 283 can be slightly oversized in comparison to the other of the first ports 281 or the second ports 283 for easier alignment during the manifold forming process.

Figure 19:
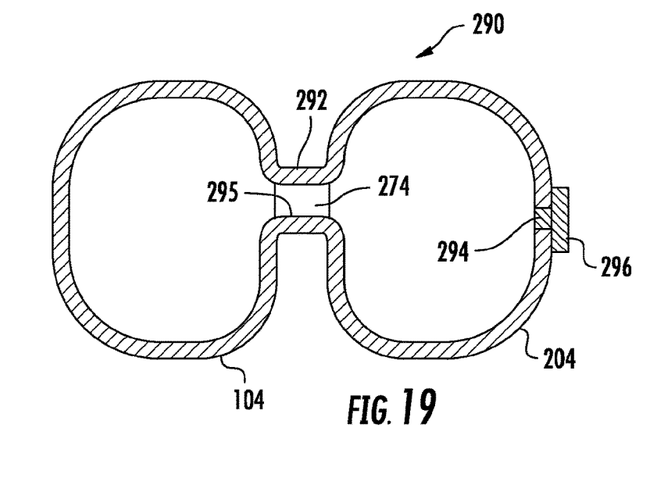
FIG. 19 is a sectioned plan view of an embodiment of an extruded dual-barrel embodiment of an integral manifold assembly.

The manifold assembly disclosed herein may also be formed as an extruded integral dual barrel tubular manifold assembly 290, for example as depicted in FIG. 19. The extruded manifold assembly 290 includes a first tubular barrel forming the manifold 104, a second tubular barrel forming the manifold 204, and a central web portion 292 joining the tubular barrels along the longitudinal extent of the assembly. A plurality of longitudinally spaced bores 295 extend transversely through the central web portion 292 to provide a plurality of flow passages 274 connecting the respective interiors of the manifolds 104, 204. The bores 295 may be drilled through the central web portion 292 of the extruded manifold assembly 290 by first providing a series of longitudinal spaced holes 294, for example by punching, drilling or milling, in the wall of one of the manifolds 104, 204 opposite the central web portion 292. A drill bit is then inserted through each hole 294 and a bore 295 is drilled through the central web portion 292. Each of the holes 294 is then closed by inserting a plug 296 into each hole 294. The inserted plugs 296 are metallurgically bonded to the manifold assembly during the brazing of the heat exchanger assembly in a brazing furnace.

Figure 20:
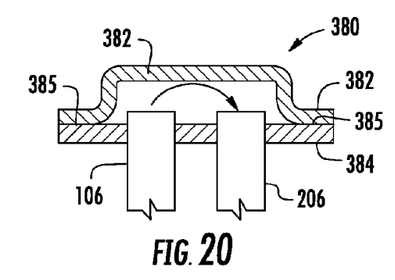
FIG. 20 is a sectioned plan view of an embodiment of a fabricated flat integral manifold assembly defining a single fluid chamber.
Figure 21:
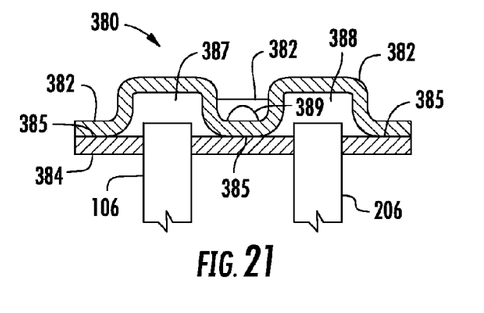
FIG. 21 is a sectioned plan view of an embodiment of a fabricated flat integral manifold assembly defining a pair of fluid chambers.
Figure 22A:
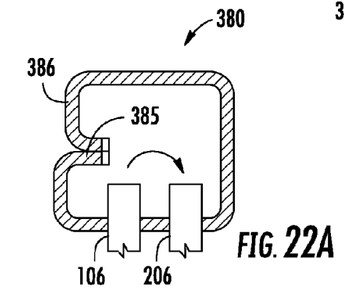
FIGS. 22A-D are sectioned plan views of various exemplary embodiments of a fabricated flat integral assembly formed from a single folded sheet.
Figure 22B:
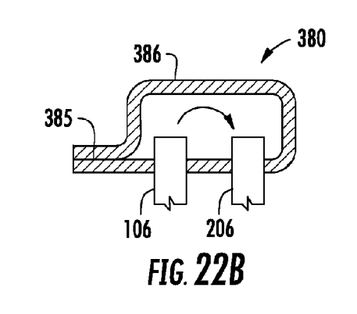
Figure 22C:
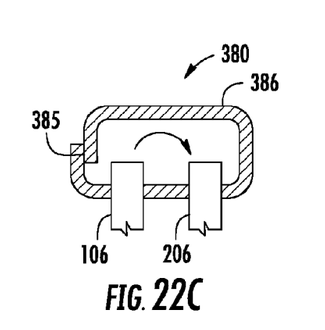
Figure 22D:
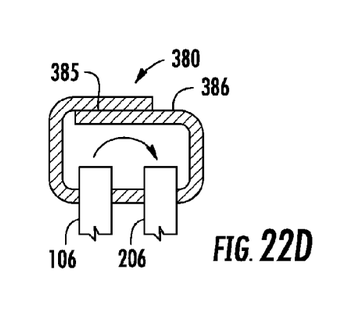

The manifold assembly disclosed herein may also be fabricated as a flat manifold rather than as paired tubular manifolds as in the previously described embodiments. Referring to FIGS. 20 and 21, the manifold assembly 380 depicted therein comprises a stamped cover plate 382 metallurgically bonded at brazed joints 385 to a flat base plate 384. Flat manifolds have a reduced interior volume as compared to comparable paired tubular manifolds. In refrigeration applications wherein the flat manifold is associated with a condenser heat exchanger, the reduced volume as compared to a comparable paired tubular manifold assembly can reduce refrigerant charge requirements up to 50%.

In the embodiment depicted in FIG. 20, the cover plate 382 is stamped to define when joined to the flat base plate 384 a single longitudinally extending chamber into which both the plurality of heat exchange tube segments 106 and the plurality of heat exchange tube segments 206 open so that refrigerant may flow from the heat exchange tube segments 106 into the heat exchange tube segments 206. In the embodiment depicted in FIG. 21, the cover plate 382 is stamped to define when joined to the flat base plate 384 a pair of longitudinally extending chambers 387 and 388 extending in parallel spaced relationship. In this embodiment, the heat exchange tube segments 106 open into chamber 387 and the heat exchange tube segments 206 open into chamber 388. Cross-over flow passages 389 may be stamped in the cover plate 382 at one or more locations along the length of the longitudinally extending cover plate 382 as desired to provide flow communication between chamber 387 and chamber 388. The location of the cross-over passages 389 determines the flow circuitry of the refrigerant passing between the chambers 387 and 388.

As depicted in FIGS. 22A-D, the flat manifold 380 may also be formed integrally from a single metal plate 386 folded into a desired shape with overlapping ends which are metallurgically bonded along a brazed joint 385. Openings for receiving the heat exchange tube segments 106 and 206 may be punched or otherwise formed through the single plate 386 prior to or after folding the plate 386 into the desired shape. The single metal plate 386 may comprise an aluminum alloy plate clad with a suitable cladding material to facilitate brazing the overlapping end portions of the plate 386 together and also brazing the heat exchange tube segments 106 and 206 to the folded plate manifold.

Although described herein in application to the second manifolds 104, 204, it is to be understood that in some embodiments of the multiple bank heat exchanger 10, the first manifolds 102 and 202 may also be formed as an integral manifold having a chamber defining the first manifold 102 and a chamber forming the first manifold 202.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A multiple bank, flattened tube heat exchange unit comprising:
a first tube bank including a first plurality of flattened tube segments extending longitudinally in spaced parallel relationship between a first manifold and a second manifold;
a second tube bank including a second plurality of flattened tube segments extending longitudinally in spaced parallel relationship between a third manifold and a fourth manifold, the second tube bank disposed behind the first tube bank;
the second manifold of the first tube bank and the fourth manifold of the second tube bank forming a manifold assembly wherein an interior volume of the second manifold of the first tube bank and an interior volume of the fourth manifold of the second tube bank of the manifold assembly are connected internally in fluid communication, at least one of the second manifold and the fourth manifold being open longitudinally over a substantially entire length thereof.

2. The multiple bank, flattened tube heat exchange unit as recited in claim 1 wherein the second manifold and the fourth manifold of the second tube bank comprises a pair of separate tubular manifolds, each of said tubular manifolds having an opening in fluid communication with the interior thereof, said tubular manifolds disposed in side-by-side relationship with the respective openings aligned.

3. The multiple bank, flattened tube heat exchange unit as recited in claim 2 further comprising a block insert having a longitudinally extending passage opening there through, said block insert disposed between said tubular manifolds with the respective at least one longitudinally spaced port of each of said tubular manifolds connected in fluid communication to the longitudinally extending passage of said block insert.

4. The multiple bank, flattened tube heat exchange unit as recited in claim 2 further comprising a plurality of tubular members, each tubular member having a first end inserted in a respective one of the plurality of longitudinally spaced ports of the second manifold of the first tube bank, a second end inserted in an aligned one of the plurality of longitudinally spaced ports of the second manifold of the second tube bank, and a circumferential flange extending radially outwardly between the first end and the second end.

5. The multiple bank, flattened tube heat exchange unit as recited in claim 4 wherein a thickness of the circumferential flange is shaped to provide a predetermined spacing between said individual manifolds.

6. The multiple bank, flattened tube heat exchange unit as recited in claim 1 wherein the manifold assembly comprises a fully tubular manifold having a plurality of ports opening to the interior thereof, and a partially open tubular manifold having a longitudinally extending open sector, the partially open tubular member metallurgically bonded to the fully tubular manifold with the plurality of ports opening to the interior of the fully tubular manifold opening in fluid flow communication with the interior of the partially tubular member through the longitudinally open sector of the partially open tubular member.

7. The multiple bank, flattened tube heat exchanger unit as recited in claim 1 wherein the manifold assembly comprises a first partially open tubular manifold having a first longitudinally extending open sector and a second partially open tubular manifold having a second longitudinally extending open sector, the first and second partially open manifolds arranged in interfacing relationship with the first longitudinally open sector aligned with the second longitudinally open sector.

8. The multiple bank, flattened tube heat exchanger unit as recited in claim 7 wherein the first and second partially open tubular manifolds are metallurgically bonded directly to each other with the first longitudinally open sector and the second longitudinally open sector directly opening to each other in fluid communication.

9. The multiple bank, flattened tube heat exchanger unit as recited in claim 7 wherein the each of the first and second partially open tubular manifolds are metallurgically bonded to a common member disposed therebetween with the first longitudinally open sector and the second longitudinally open sector in fluid communication through at least one flow passage defined by the common member.

10. The multiple bank, flattened tube heat exchanger unit as recited in claim 9 wherein the common member is disposed within the interior of the manifold assembly.

11. The multiple bank, flattened tube heat exchange unit as recited in claim 1 wherein the manifold assembly comprises an integral manifold assembly formed from a single sheet folded to form a pair of manifolds.

12. The multiple bank, flattened tube heat exchange unit as recited in claim 11 wherein a plurality of first ports are provided in the single sheet towards a first end of the sheet and a plurality of second ports are provided in the single sheet towards a second end of the sheet, and the sheet is folded upon itself with the plurality of first ports in registration with plurality of second ports.

13. The multiple bank, flattened tube heat exchanger unit as recited in claim 11 wherein the integral manifold assembly is formed from a single sheet clad with a brazing alloy.

14. The multiple bank, flattened tube heat exchanger unit as recited in claim 1 wherein the manifold assembly comprises an integral dual-barrel extruded manifold assembly having a first tubular barrel and a second tubular barrel in spaced parallel relationship and a central web member interconnecting the first and second tubular barrels, the central web member having at least one bore extending transversely therethrough and opening in fluid communication with an interior volume of the first tubular barrel and an interior volume of the second tubular barrel.

15. The multiple bank, flattened tube heat exchanger unit as recited in claim 1 wherein the manifold assembly comprises a flat manifold having a stamped cover plated metallurgically bonded to flat base plate, the flat base plate having a plurality of openings for receiving the plurality of flat tube segments of the first tube bank and a plurality of openings for receiving the plurality of flat tube segments of the second tube bank.

16. The multiple bank, flattened tube heat exchanger unit as recited in claim 15 wherein the cover plate is stamped to form a single chamber interior within the manifold assembly.

17. The multiple bank, flattened tube heat exchanger unit as recited in claim 15 wherein the cover plate is stamped to form a dual chamber interior within the manifold assembly.

18. The multiple bank, flattened tube heat exchanger unit as recited in claim 17 wherein the cover plate is stamped to form at least one flow cross-over passage between a first chamber and a second chamber of the dual chamber interior with the manifold assembly.

19. The multiple bank, flattened tube heat exchanger as recited in claim 1 wherein the manifold assembly comprises an integral folded flat manifold assembly formed from a single folded sheet.

20. The multiple bank, flattened tube heat exchanger unit as recited in claim 19 wherein the integral folded flat manifold assembly is formed from a single sheet clad with a brazing alloy.

* * * * *